US011935676B2

(12) United States Patent
Ichigozaki et al.

(10) Patent No.: US 11,935,676 B2
(45) **Date of Patent: *Mar. 19, 2024**

(54) SM—FE—N-BASED MAGNETIC MATERIAL AND MANUFACTURING METHOD THEREOF

(71) Applicant: TOYOTA JIDOSHA KABUSHIKI KAISHA, Toyota (JP)

(72) Inventors: Daisuke Ichigozaki, Toyota (JP); Tetsuya Shoji, Susono (JP); Noritsugu Sakuma, Mishima (JP); Akihito Kinoshita, Mishima (JP); Masaaki Ito, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/480,568

(22) Filed: Sep. 21, 2021

(65) Prior Publication Data

US 2022/0093298 A1 Mar. 24, 2022

(30) Foreign Application Priority Data

Sep. 24, 2020 (JP) ................................ 2020-159901

(51) Int. Cl.
*H01F 1/059* (2006.01)
*C22C 38/00* (2006.01)
(Continued)

(52) U.S. Cl.
CPC ........... *H01F 1/059* (2013.01); *C22C 38/002* (2013.01); *C22C 38/005* (2013.01); (Continued)

(58) Field of Classification Search
None
See application file for complete search history.

(56) References Cited

U.S. PATENT DOCUMENTS 6,413,327 B1 7/2002 Okajima et al.
2017/0186519 A1 6/2017 Maehara
(Continued)

FOREIGN PATENT DOCUMENTS

JP 2002-217010 A 8/2002
JP 2004-193207 A 7/2004
(Continued)

OTHER PUBLICATIONS

Office Action Issued to U.S. Appl. No. 17/475,944 dated Jan. 5, 2023.

(Continued)

*Primary Examiner* — Anthony M Liang
(74) *Attorney, Agent, or Firm* — Sughrue Mion, PLLC

(57) ABSTRACT

An Sm—Fe—N-based magnetic material according to the present disclosure includes a main phase having a predetermined crystal structure. The main phase has a composition represented by a molar ratio formula $(Sm_{(1-x-y-z)}La_x Ce_y R^1_z)_2(Fe_{(1-p-q-s)}Co_p Ni_q M_s)_{17}N_h$ (where, $R^1$ is a predetermined rare earth element, M is a predetermined element, and $0 \le x+y < 0.04$, $0 \le z \le 0.10$, $0 < p+q \le 0.10$, $0 \le s \le 0.10$, and $2.9 \le h \le 3.1$ are satisfied). A lattice volume of the main phase is 0.830 $nm^3$ to 0.840 $nm^3$, and a density of the main phase is 7.70 $g/cm^3$ to 8.00 $g/cm^3$.

10 Claims, 1 Drawing Sheet

(51) Int. Cl.

| | |
|---|---|
| ***C22C 38/10*** | (2006.01) |
| ***C23C 8/26*** | (2006.01) |
| ***H01F 41/02*** | (2006.01) |

(52) U.S. Cl.
CPC .............. *C22C 38/105* (2013.01); *C23C 8/26* (2013.01); *H01F 41/0253* (2013.01); *C22C 2202/02* (2013.01)

(56) References Cited

U.S. PATENT DOCUMENTS

| | | | |
|---|---|---|---|
| 2022/0093208 | A1 | 3/2022 | Lefkowitz et al. |
| 2022/0093297 | A1 | 3/2022 | Ichigozaki et al. |

FOREIGN PATENT DOCUMENTS

| | | | |
|---|---|---|---|
| JP | 2010-62326 | A | 3/2010 |
| JP | 2017-117937 | A | 6/2017 |
| JP | 2019-112716 | A | 7/2019 |

OTHER PUBLICATIONS

U.S. Appl. No. 17/475,944, filed Sep. 15, 2021.
Office Action dated Apr. 11, 2023 issued in U.S. Appl. No. 17/475,944.
Office Action dated Jul. 5, 2023 issued in U.S. Appl. No. 17/475,944.
Final Office Action dated Nov. 3, 2023, by the USPTO in U.S. Appl. No. 17/475,944.
Advisory Action dated Jan. 12, 2024 by the USPTO in U.S. Appl. No. 17/475,944.

SM—FE—N-BASED MAGNETIC MATERIAL AND MANUFACTURING METHOD THEREOF

CROSS-REFERENCE TO RELATED APPLICATION

This application claims priority to Japanese Patent Application No. 2020-159901 filed on Sep. 24, 2020, incorporated herein by reference in its entirety.

BACKGROUND

1. Technical Field

The present disclosure relates to an Sm—Fe—N-based magnetic material and a manufacturing method thereof. The present disclosure particularly relates to an Sm—Fe—N-based magnetic material including a main phase having at least any one of $Th_2Zn_{17}$ type and $Th_2Ni_{17}$ type crystal structures and a manufacturing method thereof.

2. Description of Related Art

As a high-performance magnetic material, an Sm—Co-based magnetic material and an Nd—Fe—B-based magnetic material have been put into practical use, but in recent years, magnetic materials other than these materials have been studied. For example, the Sm—Fe—N-based magnetic material including the main phase having at least any one of the $Th_2Zn_{17}$ type and $Th_2Ni_{17}$ type crystal structures (hereinafter, may be simply referred to as "Sm—Fe—N-based magnetic material") has been studied.

The Sm—Fe—N-based magnetic material includes the main phase having at least any one of the $Th_2Zn_{17}$ type and $Th_2Ni_{17}$ type crystal structures. In this main phase, it is considered that nitrogen is introduced into an Sm—Fe-based crystal phase in an intrusion manner.

Japanese Unexamined Patent Application Publication No. 2017-117937 (JP 2017-117937 A) discloses a manufacturing method of an Sm—Fe—N-based magnetic material, in which an oxide containing Sm, Fe, La, and W is reduced, and the reduced product is nitrided to obtain an Sm—Fe—N-based magnetic material.

SUMMARY

As compared with the Sm—Co-based magnetic material and the Nd—Fe—B-based magnetic material, the Sm—Fe—N-based magnetic material has greatly high coercive force. However, since the Sm—Fe—N-based magnetic material contains nitrogen (N), in a case of manufacture thereof, an intermediate product and the like thereof cannot be handled at a temperature at which nitrogen (N) is separated. In particular, in a case where a molded body is obtained from a powdered Sm—Fe—N-based magnetic material (hereinafter, may be referred to as "Sm—Fe—N-based magnetic material powder"), it is hard to obtain the molded body without using a binder.

As a method of obtaining the molded body from the powder, there is a sintering method. The sintering method is a method in which the powder is heated at a high temperature for long time to bake the powder. Even in a case where the powder is heated to a high temperature, when the powder is not decomposed, the powder can be baked (sintered) without using the binder. In a case where the powder is baked (sintered) as described above, since no binder is used, a density of the sintered body can be improved.

In a case where the molded body is obtained from the magnetic material powder, when the magnetic material powder can be baked (sintered) without using the binder, the density of the molded body (sintered body) can be improved and saturation magnetization of the molded body can be improved. However, since the Sm—Fe—N-based magnetic material contains nitrogen (N), in a case of obtaining the molded body, the Sm—Fe—N-based magnetic material powder cannot be heated to equal to or higher than a temperature at which nitrogen (N) is separated. From the above, it is common to use a resin binder or a metal or alloy binder having a low melting point in order to obtain the molded body of the Sm—Fe—N-based magnetic material powder. Therefore, the saturation magnetization of the molded body of the Sm—Fe—N-based magnetic material powder is decreased by a content of the binder.

An attempt has been made to reduce the content of the binder and improve the saturation magnetization of the molded body in a case where the molded body is obtained from Sm—Fe—N-based magnetic material powder and a certain result has been achieved, but it is not always sufficient. From the above, the present inventors have found that it is desired to improve the saturation magnetization of the main phase itself that expresses magnetism in the Sm—Fe—N-based magnetic material. Note that in the present specification, unless otherwise noted, the "saturation magnetization" means saturation magnetization at room temperature.

The present disclosure has been made to solve the above problems. That is, the present disclosure is to provide the Sm—Fe—N-based magnetic material in which the saturation magnetization of the main phase itself that expresses magnetism is improved as compared with the related art, and a manufacturing method thereof.

The present inventors have made extensive studies and completed an Sm—Fe—N-based magnetic material and a manufacturing method thereof according to the present disclosure. The Sm—Fe—N-based magnetic material of the present disclosure and a manufacturing method thereof include the following aspects.

<1> An Sm—Fe—N-based magnetic material including a main phase having at least any one of $Th_2Zn_{17}$ type and $Th_2Ni_{17}$ type crystal structures, in which the main phase has a composition represented by a molar ratio formula $(Sm_{(1-x-y-z)}La_xCe_yR^1_z)_2(Fe_{(1-p-q-s)}Co_pNi_qM_s)_{17}N_h$ (where, $R^1$ is one or more rare earth elements other than Sm, La, and Ce, and Zr, M is one or more elements other than Fe, Co, Ni, and a rare earth element, and an unavoidable impurity element, and $0 \leq x+y < 0.04$, $0 \leq z \leq 0.10$, $0 < p+q \leq 0.10$, $0 \leq s \leq 0.10$, and $2.9 \leq h \leq 3.1$ are satisfied), a lattice volume of the main phase is 0.830 $nm^3$ to 0.840 $nm^3$, and a density of the main phase is 7.70 $g/cm^3$ to 8.00 $g/cm^3$.

<2> The Sm—Fe—N-based magnetic material according to <1>, in which a volume fraction of the main phase is 95% to 100%.

<3> The Sm—Fe—N-based magnetic material according to <1> or <2>, in which the lattice volume of the main phase is 0.833 $nm^3$ to 0.835 $nm^3$.

<4> The Sm—Fe—N-based magnetic material according to any one of <1> to <3>, in which the density of the main phase is 7.70 $g/cm^3$ to 7.90 $g/cm^3$.

<5> A manufacturing method of the Sm—Fe—N-based magnetic material according to <1>, the method including preparing a magnetic material precursor including a crystal phase having a composition represented by a molar ratio formula $(Sm_{(1-x-y-z)}La_xCe_yR^1_z)_2(Fe_{(1-p-q-s)}Co_pNi_qM_s)_{17}$ (where, $R^1$ is one or more rare earth elements other than Sm, La, and Ce, and Zr, M is one or more elements other than Fe, Co, Ni, and a rare earth element, and an unavoidable impurity element, and $0 \le x+y < 0.04$, $0 \le z \le 0.10$, $0 < p+q \le 0.10$, and $0 \le s \le 0.10$ are satisfied), and nitriding the magnetic material precursor.

<6> The method according to <5>, in which a volume fraction of the crystal phase is 95% to 100%.

<7> The method according to <5> or <6>, in which the magnetic material precursor is pulverized to obtain magnetic material precursor powder, and then the magnetic material precursor powder is nitrided.

<8> The method according to any one of <5> to <7>, in which a raw material containing the elements constituting the magnetic material precursor is melted and solidified to obtain the magnetic material precursor.

According to the present disclosure, the Sm—Fe—N-based magnetic material can be provided in which the saturation magnetization of the main phase itself is improved by setting the lattice volume and the density of the main phase within predetermined ranges, respectively, as compared with the related art.

Further, according to the present disclosure, the manufacturing method of the Sm—Fe—N-based magnetic material can be provided in which the saturation magnetization of the main phase itself is improved by nitriding the magnetic material precursor and by setting the lattice volume and the density of the main phase within the predetermined ranges, respectively, as compared with the related art.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
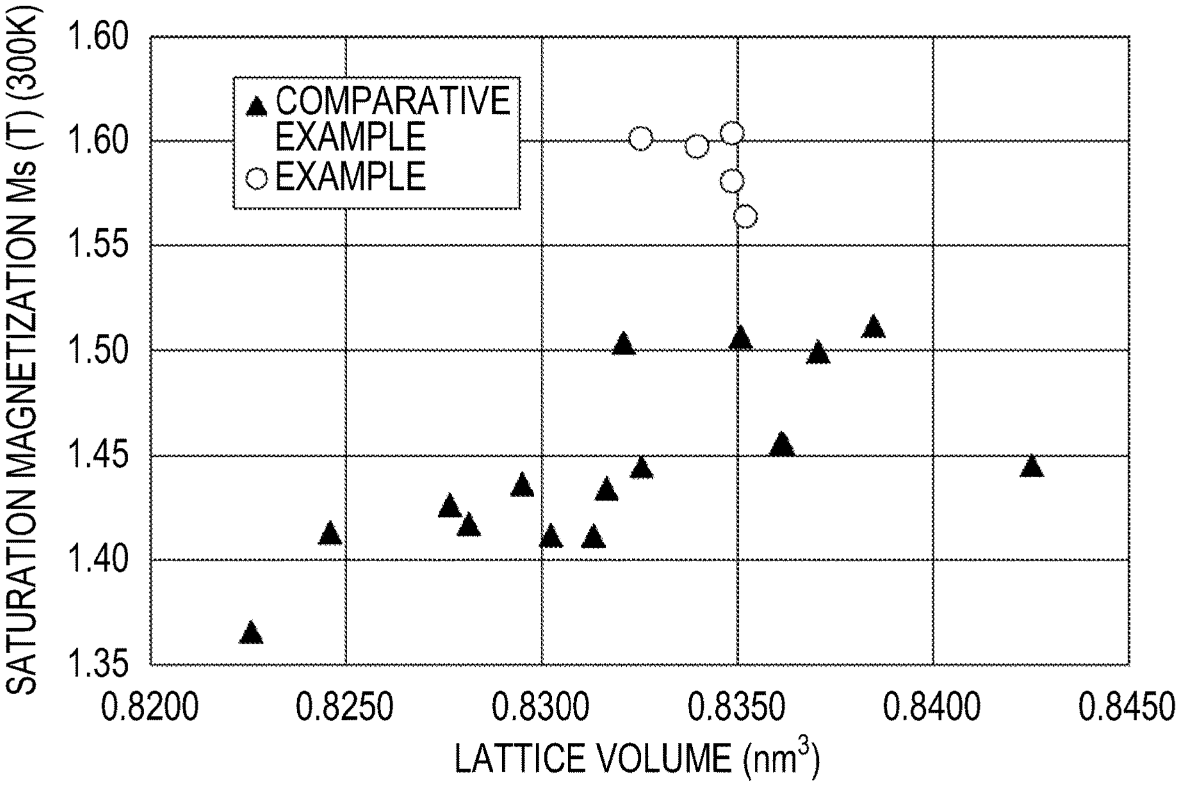
FIG. 1 is a graph showing a relationship between a lattice volume and saturation magnetization Ms (300 K)

Hereinafter, embodiments of an Sm—Fe—N-based magnetic material and a manufacturing method thereof according to the present disclosure will be described in detail. Note that the embodiments shown below do not limit the Sm—Fe—N-based magnetic material according to the present disclosure and the manufacturing method thereof.

Although not restricted by theory, the reason why saturation magnetization of a main phase itself is improved in the Sm—Fe—N-based magnetic material according to the present disclosure will be described below.

Depending on a type of a rare earth element, a magnetic material containing the rare earth element (hard magnetic material) may be mainly combined with Fe to express strong magnetic force, or may be mainly combined with Co to express strong magnetic force. Sm may be mainly combined with Fe to express strong magnetic force, and may be mainly combined with Co to express strong magnetic force.

In a case where Sm is mainly combined with Co to express strong magnetic force, the main phase that strongly expresses the magnetic force has a $CaCo_5$ type crystal structure. The main phase having the $CaCo_5$ type crystal structure is typically an $SmCo_5$ phase. The $SmCo_5$ phase expresses strong magnetic force by magnetisation. On the other hand, in a case where Sm is mainly combined with Fe to express strong magnetic force, the main phase that expresses strong magnetic force is at least any one of $Th_2Zn_{17}$ type and $Th_2Ni_{17}$ type crystal structures. The main phase having at least any one of the $Th_2Zn_{17}$ type and $Th_2Ni_{17}$ type crystal structures is typically an $Sm_2Fe_{17}N_3$ phase. In the $Sm_2Fe_{17}N_3$ phase, N is introduced into the $Sm_2Fe_{17}$ phase in an intrusion manner. The $Sm_2Fe_{17}$ phase does not express strong magnetic force even in a case of the magnetisation. In a case where the $Sm_2Fe_{17}$ phase is nitrided to form the $Sm_2Fe_{17}N_3$ phase, strong magnetic force is expressed by the magnetisation.

In the related art, studies have been made in which a part of Sm in the $Sm_2Fe_{17}N_3$ phase is substituted with a cheap light rare earth element, such as La and Ce, and/or a part of Fe is substituted with Co. However, it has been considered that in order to substitute a part of Sm with the cheap light rare earth element to improve economic efficiency, a rate of substitution with the light rare earth element is requested to be equal to or larger than a certain level, the decrease in the saturation magnetization of the main phase is inevitable. Further, it has been considered that when a part of Fe is substituted with Co, a Curie temperature of the main phase rises, so that the decrease in the saturation magnetization at a high temperature (403 K to 473 K) can be suppressed, but for the effect thereof, a rate of substitution with Ce is requested to be about 0.1 mol to 0.4 mol.

Under such a circumstance, the present inventors have focused on a lattice volume and a density of the main phase in order to improve the $Sm_2Fe_{17}N_3$ phase and obtain the main phase excellent in the saturation magnetization at a room temperature. Further, in the related art, it has been considered that the lattice volume and the density of the main phase have an inversely proportional relationship, but the present inventors have found that in a case where the density is higher than the inversely proportional relationship described above within a predetermined lattice volume range, the saturation magnetization of the main phase is improved. Further, the present inventors have found that in order to obtain the lattice volume and the density that improves the saturation magnetization of the main phase, it is advisable that a part of Fe is substituted with a small amount of Co and/or Ni and a part of Sm is optionally substituted with a small amount of La and/or Ce are advisable. Here, a "small amount" means that the amount thereof is smaller than an amount of substitution with the light rare earth element when a part of Sm is substituted with the light rare earth element for improvement of the economic efficiency and means that the amount thereof is smaller than an amount of substitution with Co when a part of Fe is substituted with Co for the rise in the Curie temperature.

The constituent elements of the Sm—Fe—N-based magnetic material and the manufacturing method thereof according to the present disclosure that have been completed based on the description and the like so far will be described below.

Sm—Fe—N-Based Magnetic Material

The Sm—Fe—N-based magnetic material according to the present disclosure includes the main phase having at least any one of the $Th_2Zn_{17}$ type and $Th_2Ni_{17}$ type crystal structures. The Sm—Fe—N-based magnetic material according to the present disclosure expresses the magnetism due to the main phase thereof. Hereinafter, the main phase will be described.

Crystal Structure of Main Phase

The main phase has at least any one of the $Th_2Zn_{17}$ type and $Th_2Ni_{17}$ type crystal structures. The crystal structure of the main phase may have a $TbCu_7$ type crystal structure or the like in addition to the structure described above. Note that Th is thorium, Zn is zinc, Ni is nickel, Tb is terbium, and Cu is copper. The crystal structure of the main phase can be identified by performing, for example, an X-ray diffraction analysis or the like with respect to the Sm—Fe—N-based magnetic material.

The phase having the crystal structure described above can be achieved by a combination (composition) of various elements, but the main phase in the Sm—Fe—N-based magnetic material according to the present disclosure is achieved by a combination (composition) of the following elements. Hereinafter, the composition of the main phase in the Sm—Fe—N-based magnetic material according to the present disclosure will be described.

Composition of Main Phase

The main phase has a composition represented by a molar ratio formula $(Sm_{(1-x-y-z)}La_xCe_yR^1_z)_2(Fe_{(1-p-q-s)}Co_pNi_qM_s)_{17}N_h$. In the composition formula described above, Sm is samarium, La is lanthanum, Ce is cerium, Fe is iron, Co is cobalt, and Ni is nickel. $R^1$ is one or more rare earth elements other than Sm, La, and Ce, and Zr. M is one or more elements other than Fe, Co, Ni, and a rare earth element, and an unavoidable impurity element. Note that Zr is zirconium. Further, in the formula described above, for convenience of the description, $Sm_{(1-x-y)}La_xCe_yR^1_z$ may be referred to as a rare earth site, $Fe_{(1-p-q-s)}Co_pNi_qM_s$ may be referred to as an iron group site.

As can be understood from the above formula, the main phase contains 2 mol of one or more elements in the rare earth site, 17 mol of one or more elements in the iron group site, and h mol of nitrogen (N). That is, one or more elements in the rare earth site and one or more elements in the iron group site constitute the phase having the crystal structure described above, and h mol of nitrogen (N) is introduced into the phase in the intrusion manner. When an introduction amount of nitrogen (N) is h mol (where, h is 2.9 to 3.1), the crystal structure described above can be maintained. Details of nitrogen (N) in the main phase will be described below.

The rare earth site consists of Sm, La, Ce, and $R^1$, and each of Sm, La, Ce, and $R^1$ is present in a ratio of $(1-x-y-z):x:y:z$ in terms of a molar ratio. An expression $(1-x-y-z)+x+y+z=1$ means that a part of Sm is substituted with one or more elements selected from the group consisting of La, Ce, and $R^1$.

The iron group site consists of Fe, Co, Ni, and M, and each of Fe, Co, Ni, and M is present in a ratio of $(1-p-q-s):p:q:s$ in terms of the molar ratio. An expression $(1-p-q-s)+p+q+s=1$ means that a part of Fe is substituted with one or more elements selected from the group consisting of Co, Ni, and M.

Hereinafter, each element that constitutes the above formula described above and the content ratio (molar ratio) thereof will be described.

Sm

Sm is a main element constituting the crystal structure described above together with Fe and N. A part of Sm is substituted with one or more elements selected from the group consisting of La, Ce, and $R^1$. Hereinafter, La, Ce, and $R^1$ will be described.

La

La is substituted with a part of Sm to contribute to the changes in the lattice volume and density of the main phase, particularly the lattice volume. Since the ionic radius of La is greatly larger than the ionic radius of Sm, when a part of Sm is substituted with La, the lattice volume of the main phase is basically increased. Where, in a case where an amount of substitution with La is small due to variations in a degree of intrusion of nitrogen (N) introduced into the main phase in the intrusion manner during nitriding, the lattice volume of the main phase may be decreased.

As described above, the ionic radius of La is greatly larger than the ionic radius of Sm. Therefore, when a part of Sm is substituted with La, the influence on the change in the lattice volume of the main phase is large. When the lattice volume of the main phase exceeds a predetermined range, the crystal structure described above cannot be maintained, or even when the crystal structure described above can be maintained, the magnetic characteristic, particularly the saturation magnetization, is deteriorated. In order to prevent above problems, it is requested not to excessively increase a rate of substitution with La when a part of Sm is substituted with La.

Since La belongs to a so-called light rare earth element, has a large reserve (resource amount) as compared with Sm, and is cheap, a usage amount of Sm is decreased by substituting a part of Sm with La and the economic efficiency is improved, and thus it is convenient.

Ce

Ce is substituted with a part of Sm to contribute to the changes in the lattice volume and density of the main phase, particularly the lattice volume. Since the ionic radius of Ce is slightly larger than the ionic radius of Sm, when a part of Sm is substituted with Ce, the lattice volume of the main phase is basically increased. Where, due to the Ce ions that can have trivalent and tetravalent values, the variations in the degree of intrusion of nitrogen (N) introduced into the main phase in the intrusion manner during nitriding, and the like, when a part of Sm is substituted with Ce, the lattice volume of the main phase may be increased or decreased.

As described above, the ionic radius of Ce is slightly larger than the ionic radius of Sm. Therefore, even when a part of Sm is substituted with Ce, the influence on the change in the lattice volume of the main phase is small. From the above, in a case where the lattice volume of the main phase is changed, the rate of substitution with Ce is relatively high when a part of Sm is substituted with Ce as compared with the case where a part of Sm is substituted with La.

Since Ce belongs to a so-called light rare earth element, has a large reserve (resource amount) as compared with Sm, and is cheap, the usage amount of Sm is decreased by substituting a part of Sm with Ce and the economic efficiency is improved, and thus it is convenient.

$R^1$ $R^1$ is one or more rare earth elements other than Sm, La, and Ce, and Zr. $R^1$ is one or more elements that are allowed to be contained within a range in which the magnetic characteristic of the Sm—Fe—N-based magnetic material according to the present disclosure is not impaired. $R^1$ is typically one or more rare earth elements other than Sm, La, and Ce that are difficult to completely separate from each of Sm, La, and Ce and remain in a small amount in a raw material when the raw material containing each of Sm, La, and Ce is purified. In addition to such rare earth elements, $R^1$ may contain Zr. Zr is not a rare earth element, but a part of Sm may be substituted with Zr. Even when a part of Sm is substituted with Zr, when the amount of substitution thereof is small, the magnetic characteristic of the Sm—Fe—N-based magnetic material is not significantly impaired.

In the present specification, the rare earth elements include 17 elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and ruthenium (Lu).

Fe

Fe is a main element constituting the crystal structure described above together with Sm and N. A part of Fe may be substituted with one or more elements selected from the group consisting of Co, Ni, and M. Hereinafter, Co, Ni, and M will be described.

Co

Co is substituted with a part of Fe to contribute to the changes in the lattice volume and the density of the main phase. Since the ionic radius of Co is smaller than the ionic radius of Fe, when a part of Fe is substituted with Co, the lattice volume of the main phase is basically decreased. Where, due to the variations in the degree of intrusion of nitrogen (N) introduced into the main phase in the intrusion manner during nitriding, and the like, when a part of Fe is substituted with Co, the lattice volume of the main phase may be increased or decreased.

Substituting a part of Fe with Co is convenient in that the Curie temperature of the main phase rises, and the decrease in the saturation magnetization at the high temperature (403 K to 473 K) can be suppressed.

Ni

Ni is substituted with a part of Fe to contribute to the changes in the lattice volume and the density of the main phase. Since the ionic radius of Ni is smaller than the ionic radius of Fe, when a part of Fe is substituted with Ni, the lattice volume of the main phase is basically decreased. Where, due to the variations in the degree of intrusion of nitrogen (N) introduced into the main phase in the intrusion manner during nitriding, and the like, when a part of Fe is substituted with Ni, the lattice volume of the main phase may be increased or decreased.

As compared with Fe, Ni contributes less to the expression of the magnetization. Therefore, in the related art, it has been considered that in a case where a part of Fe in the main phase is substituted with Ni, there is a concern that the magnetic characteristic is decreased. However, since the ionic radius of Ni is smaller than the ionic radius of Co, as compared with a case where a part of Fe is substituted with Co, in a case where a part of Fe is substituted with Ni, the lattice volume of the main phase is significantly decreased even when the rate of substitution with Ni is not so increased. As a result, rather than the decrease in the magnetic characteristic due to the substitution of a part of Fe with Ni, improvement in the magnetic characteristic, particularly the saturation magnetization, due to a significant change in the lattice volume of the main phase can be recognized.

M

M is one or more elements other than Fe, Co, Ni, and a rare earth element, and an unavoidable impurity element. M is one or more elements and the unavoidable impurity element that are allowed to be contained within the range in which the magnetic characteristic of the Sm—Fe—N-based magnetic material according to the present disclosure is not impaired. The unavoidable impurity element refers to an impurity element in which avoiding inclusion is unavoidable when the Sm—Fe—N-based magnetic material according to the present disclosure is manufactured, or causes a significant increase in the manufacturing cost to avoid its inclusion. Examples of such unavoidable impurity element include an impurity element in raw material, or an element, such as copper (Cu), zinc (Zn), gallium (Ga), aluminum (Al), boron (B), and the like, in which for example, when a bond molded body is formed, elements in a bond diffuse and/or intrude on a surface of the main phase. In addition, examples thereof include an element contained in a lubricant or the like used during molding, the element diffusing and/or intruding on the surface of the main phase. Note that the bond molded body will be described below.

Examples of M excluding the unavoidable impurity element include one or more elements selected from the group consisting of titanium (Ti), chromium (Cr), manganese (Mn), vanadium (V), molybdenum (Mo), tungsten (W), and carbon (C). These elements, for example, form a nuclear material during the generation of the main phase and contribute to promotion of miniaturization of the main phase and/or the suppression of grain growth of the main phase.

Further, Zr can be contained as M. As described above, Zr is not a rare earth element, but a part of Sm may be substituted with Zr, while a part of Fe may be substituted with Zr. In any case, when the amount of substitution thereof is small, the magnetic characteristic of the Sm—Fe—N-based magnetic material is not significantly impaired.

N

N is introduced into the main phase having the crystal structure described above in the intrusion manner. When N is introduced into such an extent that N does not break the phase having the crystal structure described above, a magnetic moment is expressed in the main phase.

When the main phase in the Sm—Fe—N-based magnetic material according to the present disclosure is constituted of the elements described so far and the lattice volume and the density of the main phase are within the predetermined ranges, desired saturation magnetization is obtained. Hereinafter, the lattice volume and the density will be described.

Lattice Volume

The lattice volume of the main phase in the Sm—Fe—N-based magnetic material according to the present disclosure is within a range of 0.830 $nm^3$ to 0.840 $nm^3$. When the lattice volume of the main phase is within the range described above and the density of the main phase is within a range to be described below, the desired saturation magnetization is obtained.

Although not restricted by theory, it is considered that the reason why the lattice volume of the main phase is requested to be within the range described above in order to obtain the desired saturation magnetization is as follows.

As described above, the saturation magnetization of the Sm—Fe—N-based magnetic material is derived from the fact that the magnetic moment is expressed in the main phase by introducing N into the main phase in the intrusion manner. From the above, the saturation magnetization is greatly affected by a distance between Fe and N in a lattice of the main phase (hereinafter, may be simply referred to as "distance between Fe and N"). Fe and N are three-dimensionally arranged in the lattice of the main phase, and thus the lattice volume of the main phase is convenient for grasping the distance between Fe and N.

In the Sm—Fe—N-based magnetic material according to the present disclosure, a part of Fe is substituted with Co and/or Ni and a part of Sm is optionally substituted with La and/or Ce, so that the lattice volume of the $Sm_2Fe_{17}N_3$ phase is changed. In this case, it is considered that it is advisable to set the distance between Fe and N in the lattice of the main phase close to the distance between Fe and N in the lattice of the $Sm_2Fe_{17}N_3$ phase. Since the lattice volume of the $Sm_2Fe_{17}N_3$ phase is about 0.838 $nm^3$, it is considered that it is advisable to set the lattice volume of the main phase in the Sm—Fe—N-based magnetic material according to the present disclosure close to 0.838 $nm^3$. From this viewpoint, the lattice volume of the main phase in the Sm—Fe—N-based magnetic material according to the present disclosure may be 0.830 $nm^3$ or more, 0.831 $nm^3$ or more, 0.832 $nm^3$ or more, 0.833 $nm^3$ or more, or 0.834 $nm^3$ or more, and may be 0.840 $nm^3$ or less, 0.839 $nm^3$ or less, 0.838 $nm^3$ or less, 0.837 $nm^3$ or less, 0.836 $nm^3$ or less, or 0.835 $nm^3$ or less.

The lattice volume of the main phase can be obtained by the following points. The X-ray diffraction analysis is performed with respect to the Sm—Fe—N-based magnetic material, and an a-axis length and a c-axis length are obtained from an X-ray diffraction pattern based on a relationship between a plane index and a lattice plane spacing value (d value). When the a-axis length and the c-axis length are obtained, since the main phase in the Sm—Fe—N-based magnetic material according to the present disclosure has the crystal structure described above, the main phase may be assumed to be a rhombohedral crystal. Therefore, as the plane index, a (202) plane, a (113) plane, a (104) plane, a (211) plane, a (122) plane, and a (300) plane can be used. Then, the lattice volume is calculated according to the following expression.

$$(\text{Lattice volume})=\{(a\text{-axis length})/2\}^2\times 6\times 3^{0.5}\times\{(c\text{-axis length})/3\}$$

Density of Main Phase

Usually, the lattice volume and the density of the crystal phase have the inversely proportional relationship. However, in the Sm—Fe—N-based magnetic material according to the present disclosure, the density is higher than the inversely proportional relationship between the lattice volume and the density of the main phase. With such a density, the saturation magnetization of the main phase is higher than the saturation magnetization of the $Sm_2Fe_{17}N_3$ phase. It has been experimentally confirmed that such a density is obtained when the lattice volume of the main phase is in the range described above and a part of Fe is substituted with a small amount of Co and/or Ni. In addition, it has been confirmed that a part of Sm may be optionally substituted with La and/or Ce. The description of a "small amount" has already been made. Specifically, x+y is 0 or more, 0.01 or more, or 0.02 or more, and less than 0.04 or 0.03 or less. In addition, the value of p+q is 0.01 or more, 0.02 or more, or 0.03 or more, and 0.05 or less or 0.04 or less.

The density of the main phase may be 7.70 $g/cm^3$ or more, 7.71 $g/cm^3$ or more, 7.73 $g/cm^3$ or more, 7.75 $g/cm^3$ or more, 7.77 $g/cm^3$ or more, 7.79 $g/cm^3$ or more, 7.80 $g/cm^3$ or more, 7.81 $g/cm^3$ or more, 7.83 $g/cm^3$ or more, 7.85 $g/cm^3$ or more, or 7.87 $g/cm^3$ or more, and may be 8.00 $g/cm^3$ or less, 7.98 $g/cm^3$ or less, 7.96 $g/cm^3$ or less, 7.94 $g/cm^3$ or less, 7.92 $g/cm^3$ or less, or 7.90 $g/cm^3$ or less.

The density of the main phase is obtained by pulverizing the Sm—Fe—N-based magnetic material to obtain powder and measuring the density of the powder by a pycnometer method. As described above, in the Sm—Fe—N-based magnetic material according to the present disclosure, it is preferable that the volume fraction of the main phase be 95%. Further, the densities of the $Sm_2Fe_{17}N_3$ phase and the $SmFe_3$ phase are 7.65 $g/cm^3$ and 8.25 $g/cm^3$, respectively, and are not so different. From the above, the density of the main phase can be approximated by the value obtained by the measurement method described above.

In the Sm—Fe—N-based magnetic material according to the present disclosure, a part of Fe is substituted with Co and/or Ni and a part of Sm is optionally substituted with La and/or Ce such that the lattice volume and the density of the main phase are within the ranges described above. Regarding above, the description will be made below by using the formula $(Sm_{(1-x-y-z)}La_xCe_yR^1_z)_2(Fe_{(1-p-q-s)}Co_pNi_qMs)_{17}N_h$ that represents the composition of the main phase in terms of the molar ratio.

x+y

In the above formula that represents the composition of the main phase, a value of x indicates a ratio (molar ratio) in which a part of Sm is substituted with La, and a value of y indicates a ratio (molar ratio) in which a part of Sm is substituted with Ce.

The lattice volume of the main phase is changed by substituting a part of Fe with Co and/or Ni, but the lattice volume of the main phase may be changed by optionally substituting a part of Sm with La and/or Ce. From the above, the value of x+y may be 0 or more, 0.01 or more, or 0.02 or more. On the other hand, when the value of x+y is less than 0.04 or 0.03 or less, the lattice volume of the main phase is not excessively changed, particularly, is not excessively increased.

Further, while the value of x+y satisfies the range described above, the value of x may be 0 or more, 0.01 or more, or 0.02 or more, and may be less than 0.04 or 0.03 or less. Similarly, while the value of x+y satisfies the range described above, the value of y may be 0 or more, 0.01 or more, or 0.02 or more, and may be less than 0.04 or 0.03 or less.

z

In the above formula that represents the composition of the main phase, z indicates a ratio (molar ratio) in which a part of Sm is substituted with $R^1$. As described above, $R^1$ is one or more rare earth elements and Zr that are allowed to be contained within the range in which the magnetic characteristic of the Sm—Fe—N-based magnetic material according to the present disclosure is not impaired. From the above, z may be 0.10 or less, 0.08 or less, 0.06 or less, 0.04 or less, or 0.02 or less. On the other hand, the Sm—Fe—N-based magnetic material according to the present disclosure may not contain $R^1$ at all, that is, z may be 0, but it is difficult to prevent $R^1$ from being contained in the raw material at all when the Sm—Fe—N-based magnetic material according to the present disclosure is manufactured. From this viewpoint, z may be 0.01 or more.

p+q

In the above formula that represents the composition of the main phase, a value of p indicates a ratio (molar ratio) in which a part of Fe is substituted with Co, and a value of q indicates a ratio (molar ratio) in which a part of Fe is substituted with Ni.

As described above, the lattice volume of the main phase is changed by substituting a part of Fe with Co and/or Ni. When the value of p+q exceeds 0, the lattice volume of the main phase is changed. From this viewpoint, the value of p+q may be 0.01 or more, 0.02 or more, or 0.03 or more. On the other hand, when the value of p+q is 0.10 or less, the lattice volume of the main phase is not excessively changed. From this viewpoint, the value of p+q may be 0.09 or less, 0.08 or less, 0.07 or less, 0.06 or less, 0.05 or less, or 0.04 or less.

Further, while the value of p+q satisfies the range described above, the value of p may exceed 0, may be 0.01 or more, 0.02 or more, or 0.03 or more, and may be 0.10 or less, 0.09 or less, 0.08 or less, 0.07 or less, 0.06 or less, 0.05 or less, or 0.04 or less. Similarly, while the value of p+q satisfies the range described above, the value of q may exceed 0, may be 0.01 or more, 0.02 or more, or 0.03 or more, and may be 0.10 or less, 0.09 or less, 0.08 or less, 0.07 or less, 0.06 or less, 0.05 or less, or 0.04 or less.

In the above formula that represents the composition of the main phase, s indicates a ratio (molar ratio) in which a part of Fe is substituted with M. As described above, M is one or more elements and the unavoidable impurity element that are allowed to be contained within the range in which the magnetic characteristic of the Sm—Fe—N-based magnetic material according to the present disclosure is not impaired. From the above, s may be 0.10 or less, 0.08 or less, 0.06 or less, 0.04 or less, or 0.02 or less. On the other hand, the Sm—Fe—N-based magnetic material according to the present disclosure may not contain M at all, that is, s may be 0, but it is difficult to prevent the unavoidable impurity element in M from being contained at all. From this viewpoint, s may be 0.01 or more.

Relationship Between x, y, z, p, q, and s x, y, z, p, q, and s satisfy the conditions for x, y, z, p, q, and s described so far, respectively, and are appropriately decided such that the lattice volume and the density of the main phase are within the range described above. In this case, it is preferable that x, y, p, and q satisfy a relationship of Expression (1) below.

$$830 \leq 16.267x + 3.927y - 26.279p - 56.5327q + 836 \leq 840 \quad \text{Expression (1)}$$

The reason why it is preferable that x, y, p, and q satisfy Expression (1) will be described below.

In Expression (1), a relational expression represented by "16.267x+3.927y−26.279p−56.5327q+836" enclosed by inequality signs represents the lattice volume of the main phase by x, y, p, and q. This relational expression represents a result of calculating, for the $Sm_2Fe_{17}N_3$ phase, the lattice volume of the main phase when a part of Sm is substituted with La and/or Ce and a part of Fe is substituted with Co and/or Ni by using machine learning. Hereinafter, in Expression (1), "16.267x+3.927y−26.279p−56.5327q+836" enclosed by inequality signs may be referred to as a "relational expression that represents the lattice volume of the main phase".

Then, Expression (1) means that the "relational expression that represents the lattice volume of the main phase" is within a range of 830 cubic angstrom to 840 cubic angstrom (0.830 $nm^3$ to 0.840 $nm^3$). As described above, the lattice volume of the main phase in the Sm—Fe—N-based magnetic material according to the present disclosure is within the range of 0.830 $nm^3$ to 0.840 $nm^3$. From the above, it means that it is preferable that in the composition of the main phase in the Sm—Fe—N-based magnetic material according to the present disclosure, s, y, p, and q satisfy Expression (1).

The reason why z regarding $R^1$ and s regarding M are not contained in the "relational expression that represents the lattice volume of the main phase" is as follows.

$R^1$ and M are one or more elements that are allowed to be contained within the range in which the magnetic characteristic of the Sm—Fe—N-based magnetic material according to the present disclosure is not impaired. Since the magnetic characteristic and the lattice volume of the main phase have close relationship, the influence on the lattice volume of the main phase is small as long as z and s are within the range in which the magnetic characteristic of the Sm—Fe—N-based magnetic material according to the present disclosure is not impaired, and the necessity of considering z and s is low. Therefore, z and s are not taken into consideration in the "relational expression that represents the lattice volume of the main phase".

As described above, the "relational expression that represents the lattice volume of the main phase" is acquired by machine learning, but the relational expression shows the following technical significance and is considered to be highly reliable.

First, a case of x=y=p=q=0 means a case where a part of Sm is not substituted with La and/or Ce and a part of Fe is not substituted with Co and/or Ni. That is, the case of x=y=p=q=0 means that the lattice volume of the $Sm_2Fe_{17}N_3$ phase is 836 cubic angstrom (0.836 $nm^3$). Since it is known that an actual lattice volume of $Sm_2Fe_{17}N_3$ phase is about 0.838 $nm^3$, it can be understood that a value of the lattice volume of $Sm_2Fe_{17}N_3$ phase in the "relational expression that represents the lattice volume of the main phase" is greatly close to the actual value.

A ratio of the coefficients of x and y (16.267:3.927) is close to a ratio of the ionic radius of La and the ionic radius of Ce. A ratio of absolute values of the coefficients of p and q (26.279:56.5327) is close to a ratio of the ionic radius of Co and the ionic radius of Ni.

Then, each of the coefficients described above indicates magnitude of the influence on the change in the lattice volume of the main phase when a part of Sm is substituted with La and/or Ce, or a part of Fe is substituted with Co and/or Ni.

The fact that the coefficients of x and y are positive indicates that when a part of Sm is substituted with La and/or Ce, the lattice volume of the main phase is basically increased. The fact that the coefficient of x is larger than the coefficient of y indicates that since the ionic radius of La is larger than the ionic radius of Ce, the substitution of a part of Sm with La has large influence on the change in the lattice volume of the main phase as compared with the substitution of a part of Sm with Ce.

The fact that the coefficients of p and q are negative indicates that when a part of Fe is substituted with Co and/or Ni, the lattice volume of the main phase is basically decreased. The fact that the absolute value of the coefficient of p is larger than the absolute value of the coefficient of q indicates that since the ionic radius of Ni is larger than the ionic radius of Co, the substitution of a part of Fe with Co has large influence on the change in the lattice volume of the main phase as compared with the substitution of a part of Fe with Ni.

The reason for the description of "basically" in the description regarding the coefficient of the "relational expression that represents the lattice volume of the main phase" so far will be described.

In Expression (1), the "relational expression that represents the lattice volume of the main phase" relates to the $Sm_2Fe_{17}N_3$ phase, and is acquired by using machine learning on the assumption that a part of Sm is substituted with La and/or Ce, and a part of Fe is substituted with Co and/or Ni. Actually, when the $Sm_2Fe_{17}$ phase is nitrided, in addition to the $Sm_2Fe_{17}N_3$ phase, an $Sm_2Fe_{17}N_h$ phase (where, h is 2.9 to 3.1) is obtained depending on a degree of nitriding. Details of h will be described below.

The coefficients of x, y, p, and q are changed depending on the degree of nitriding. As the absolute value of the coefficient is smaller, the coefficient is more likely to be affected by the degree of nitriding. For example, among the coefficients of x, y, p, and q, the absolute value of the coefficient of y is the smallest, and thus y is likely to be affected by the degree of nitriding. Specifically, when a part of Sm is substituted with Ce, the lattice volume of the main phase is basically increased. Therefore, the coefficient of y is basically positive. However, the coefficient of y may be decreased depending on the degree of nitriding. In that case, since the absolute value of the coefficient of y is small, the coefficient of y can be negative as the coefficient of y is decreased. The fact that the coefficient of y is negative means that the lattice volume of the main phase is decreased even when a part of Sm is substituted with Ce. The above is because the ionic radius of Ce is large as compared with the ionic radius of Sm, but the difference thereof is small, so that the absolute value of the coefficient of y is small. In addition, the above is also because the Ce ions have trivalent and tetravalent values, and the coefficient of y is likely to be changed.

On the other hand, since the ionic radius of La is greatly large as compared with the ionic radius of Sm, the coefficient is less likely to be affected by the degree of nitriding. Specifically, when a part of Sm is substituted with La, the lattice volume of the main phase is basically increased. Therefore, the coefficient of x is basically positive. However, the coefficient of x may be decreased depending on the degree of nitriding. Even in that case, since the absolute value of the coefficient of x is relatively large, even when the coefficient of x is decreased, it is difficult for the coefficient of x to be negative. Examples of a case where the coefficient of x is decreased depending on the degree of nitriding until the coefficient of x is negative include a case where the amount of substitution with La is small.

In a case where a part of Fe is substituted with Co and/or Ni, the lattice volume of the main phase is basically decreased. Therefore, the coefficients of p and q are basically negative. However, the coefficients of p and q may be increased depending on the degree of nitriding. Even in that case, since the absolute values of the coefficients of p and q are large as compared with the absolute values of the coefficients of x and y, even when the coefficients of p and q are increased, it is difficult for the coefficients of p and q to be positive.

As described so far, in Expression (1), the "relational expression that represents the lattice volume of the main phase" has the technical significance as described above even when acquired by machine learning. It has been experimentally confirmed that the desired saturation magnetization is obtained when the lattice volume of the main phase is within the range of 0.830 $nm^3$ to 0.840 $nm^3$ and the density of the main phase is within the range of 7.70 $g/cm^3$ to 8.00 $g/cm^3$. From the above, it is preferable that x, y, p, and q first satisfy Expression (1).

Further, for x, y, p, and q in which the density of the main phase is within the range of 7.70 $g/cm^3$ to 8.00 $g/cm^3$, Expression (2) obtained by machine learning can be referred to.

$$0.0619 \leq -0.817x - 0.5669y + 0.499p + 2.606q \leq 0.16194 \quad \text{Expression (2)}$$

h

Next, h that indicates the degree of nitriding will be described. When the $Sm_2Fe_{17}$ phase is nitrided, the $Sm_2Fe_{17}N_h$ phase (where, h=3) is basically formed. Nitriding is typically performed by exposing an Sm—Fe—N-based magnetic material precursor (hereinafter, simply referred to as "precursor") having the $Sm_2Fe_{17}$ phase at a high temperature in a nitrogen gas atmosphere. Therefore, since the degree of nitriding differs between a surface and an inside of the precursor, h can fluctuate within the range of 2.9 to 3.1. The same applies to a case where a part of Sm is substituted with La and/or Ce and a part of Fe is substituted with Co and/or Ni in the precursor. That is, when the (Sm, La, $Ce)_2$(Fe, Co, $Ni)_{17}$ phase is nitrided, (Sm, La, $Ce)_2$(Fe, Co, $Ni)_{17}N_h$ phase (where, h is 2.9 to 3.1) is formed.

Volume Fraction of Main Phase

The Sm—Fe—N-based magnetic material according to the present disclosure includes the main phase represented by the composition formula described above. The magnetic characteristic of the Sm—Fe—N-based magnetic material according to the present disclosure is expressed by the main phase. Therefore, it is preferable that the volume fraction of the main phase to the entire Sm—Fe—N-based magnetic material according to the present disclosure be high. Specifically, the volume fraction of the main phase to the entire Sm—Fe—N-based magnetic material according to the present disclosure may be 95% or more, 96% or more, or 97% or more. On the other hand, when the Sm—Fe—N-based magnetic material according to the present disclosure is manufactured, there is a case where a step is present in which a phase other than the main phase represented by the composition formula described above is within a stable temperature region. Also, there is a case where it is difficult to eliminate the inclusion of the unavoidable impurity element that does not constitute the main phase. From the above, the volume fraction of the main phase is ideally 100%, but there is no problem in practical use even when the volume fraction of the main phase is 99% or less or 98% or less as long as the volume fraction of the main phase described above is secured.

The phase other than the main phase is typically present at grain boundaries between the main phases, particularly at a triple point. Examples of the phase other than the main phase include, typically, an $SmFe_3$ phase and a nitrided phase thereof. Examples of the $SmFe_3$ phase and the nitrided phase thereof include a phase in which a part of Sm is substituted with one or more elements selected from the group consisting of La, Ce, and $R^1$, and a nitrided phase thereof, a phase in which a part of Fe is substituted with one or more elements selected from the group consisting of Co, Ni, and M, and a nitrided phase thereof, and a phase in which a part of Sm is substituted with one or more elements selected from the group consisting of La, Ce, and $R^1$ and a part of Fe is substituted with one or more elements selected from the group consisting of Co, Ni, and M, and nitrided phases thereof.

The volume fraction of the main phase is obtained by measuring the entire composition of the precursor before nitriding by using inductively coupled plasma atomic emission spectroscopy (ICP-AES) to calculate the volume fraction of the main phase from the measured value on the assumption that the precursor before nitriding is divided into an (Sm, La, Ce, $R^1)_2$(Fe, Co, Ni, $M)_{17}$ phase and an (Sm, La, Ce, $R^1$)(Fe, Co, Ni, $M)_3$ phase. Specifically, after a mass concentration (mass ratio) of each element is obtained from the measurement result by the ICP, a mass ratio of $Sm_2Fe_{17}$ phase and $SmFe_3$ phase is first calculated, and the volume fraction is calculated from a density of each phase. Note that the (Sm, La, Ce, $R^1)_2$(Fe, Co, Ni, $M)_{17}$ phase represents the $Sm_2Fe_{17}$ phase, a phase in which a part of Sm in the $Sm_2Fe_{17}$ phase is substituted with one or more elements selected from the group consisting of Sm, La, Ce, and $R^1$, a phase in which a part of Fe in the $Sm_2Fe_{17}$ phase is substituted with one or more elements selected from the group consisting of Co, Ni, and M, and a phase in which a part of Sm in the $Sm_2Fe_{17}$ phase is substituted with one or more elements selected from the group consisting of Sm, La, Ce, and $R^1$ and a part of Fe in the $Sm_2Fe_{17}$ phase is substituted with one or more elements selected from the group consisting of Co, Ni, and M. Further, the (Sm, La, Ce, $R^1$)(Fe, Co, Ni, $M)_3$ phase represents the $SmFe_3$ phase, a phase in which a part of Sm in the $SmFe_3$ phase is substituted with one or more elements selected from the group consisting of Sm, La, Ce, and $R^1$, a phase in which a part of Fe in the $SmFe_3$ phase is substituted with one or more elements selected from the group consisting of Co, Ni, and M, and a phase in which a part of Sm in the $SmFe_3$ phase is substituted with one or more elements selected from the group consisting of Sm, La, Ce, and $R^1$ and a part of Fe in the $SmFe_3$ phase is substituted with one or more elements selected from the group consisting of Co, Ni, and M.

The entire composition (the sum of the main phase and the phase other than the main phase) of the Sm—Fe—N-based magnetic material according to the present disclosure can be set to be equal to or larger than the total number of moles of Sm, La, Ce, and $R^1$ of the main phase from the viewpoint of suppressing expression of an α-(Fe, Co, Ni, M) phase and a nitrided phase thereof during manufacturing of the Sm—Fe—N-based magnetic material according to the present disclosure. That is, the entire composition of the Sm—Fe—N-based magnetic material according to the present disclosure may be $(Sm_{(1-x-y-z)}La_xCe_yR^1_z)_w(Fe_{(1-p-q-s)}Co_pNi_qM_s)_{17}N_h$ (where, w is 2.00 to 3.00). In this case, x, y, z, p, q, s, and h may be the same as x, y, z, p, q, s, and h in the above-described formula that represents the composition of the main phase. From the viewpoint of suppressing the expression of the α-(Fe, Co, Ni, M) phase, w is preferably 2.02 or more, 2.04 or more, 2.06 or more, 2.08 or more, 2.10 or more, 2.20 or more, 2.30 or more, 2.40 or more, or 2.50 or more. On the other hand, from the viewpoint of decreasing the volume fraction of the (Sm, La, Ce, $R^1$)(Fe, Co, Ni, $M)_3$ phase described above, w is preferably 2.90 or less, 2.80 or less, 2.70 or less, or 2.60 or less.

Manufacturing Method

Next, a manufacturing method of the Sm—Fe—N-based magnetic material according to the present disclosure (hereinafter, may be referred to as the "manufacturing method according to the present disclosure") will be described.

The manufacturing method according to the present disclosure includes a magnetic material precursor preparation step and a nitriding step. Hereinafter, each of the steps will be described.

Magnetic Material Precursor Preparation Step

In the manufacturing method of the Sm—Fe—N-based magnetic material according to the present disclosure, the magnetic material precursor including the crystal phase having the composition represented by the molar ratio formula $(Sm_{(1-x-y-z)}La_xCe_yR^1_z)_2(Fe_{(1-p-q-s)}Co_pNi_qM_s)_{17}$ is prepared.

In the formula that represents the composition of the crystal phase, Sm, La, Ce, $R^1$, Fe, Co, Ni, M, x, y, z, p, q, and s are as described in "Sm—Fe—N-Based Magnetic Material".

The crystal phase in the magnetic material precursor has at least any one of the $Th_2Zn_{17}$ type and $Th_2Ni_{17}$ type crystal structures. When the magnetic material precursor is nitrided, the crystal phase in the magnetic material precursor is nitrided to form the main phase in the Sm—Fe—N-based magnetic material according to the present disclosure. The main phase in Sm—Fe—N-based magnetic material according to the present disclosure has at least any one of the $Th_2Zn_{17}$ type and $Th_2Ni_{17}$ type crystal structures. From the above, nitriding is performed to the extent that at least any one of the $Th_2Zn_{17}$ type and $Th_2Ni_{17}$ type crystal structures is maintained.

As described above, since the crystal phase in the magnetic material precursor is nitrided to form the main phase in the Sm—Fe—N-based magnetic material according to the present disclosure, the volume fraction of the crystal phase in the magnetic material precursor may be considered to be equivalent to the volume fraction of the main phase in the Sm—Fe—N-based magnetic material according to the present disclosure. From the above, the volume fraction of the crystal phase in the magnetic material precursor may be 95% or more, 96% or more, or 97% or more with respect to the entire magnetic material precursor. When the magnetic material precursor is manufactured, there is a case where a step is present in which a phase other than the crystal phase represented by the composition formula described above is within a stable temperature region. In addition, there is a case where it is difficult to eliminate the inclusion of the unavoidable impurity element that does not constitute the crystal phase. The volume fraction of the crystal phase is ideally 100%, but there is no problem in practical use even when the volume fraction of the crystal phase is 99% or less or 98% or less as long as the volume fraction of the main phase described above is secured.

The phase other than the crystal phase is typically present at grain boundaries between the crystal phases, particularly at a triple point. Examples of the phase other than the crystal phase include, typically, an $SmFe_3$ phase. Examples of the $SmFe_3$ phase include a phase in which a part of Sm is substituted with one or more elements selected from the group consisting of La, Ce, and $R^1$, a phase in which a part of Fe is substituted with one or more elements selected from the group consisting of Co, Ni, and M, and a phase in which a part of Sm is substituted with one or more elements selected from the group consisting of La, Ce, and $R^1$ and a part of Fe is substituted with one or more elements selected from the group consisting of Co, Ni, and M.

The volume fraction of the crystal phase is obtained by measuring the entire composition of the precursor before nitriding by using inductively coupled plasma atomic emission spectroscopy (ICP-AES) to calculate a main phase ratio from the measured value on the assumption that the precursor before nitriding is divided into an (Sm, La, Ce, $R^1)_2$(Fe, Co, Ni, $M)_{17}$ phase and an (Sm, La, Ce, $R^1$)(Fe, Co, Ni, $M)_3$ phase. Specifically, after a weight concentration (weight ratio) of each element is obtained from the measurement result by the ICP, a weight ratio of $Sm_2Fe_{17}$ phase and $SmFe_3$ phase is first calculated, and the volume fraction is calculated from a density of each phase. Note that the (Sm, La, Ce, $R^1)_2$(Fe, Co, Ni, $M)_{17}$ phase represents the $Sm_2Fe_{17}$ phase, a phase in which a part of Sm in the $Sm_2Fe_{17}$ phase is substituted with one or more elements selected from the group consisting of Sm, La, Ce, and $R^1$, the phase in which a part of Fe in the $Sm_2Fe_{17}$ phase is substituted with one or more elements selected from the group consisting of Co, Ni, and M, and the phase in which a part of Sm in the $Sm_2Fe_{17}$ phase is substituted with one or more elements selected from the group consisting of Sm, La, Ce, and $R^1$ and a part of Fe in the $Sm_2Fe_{17}$ phase is substituted with one or more elements selected from the group consisting of Co, Ni, and M. Also, the (Sm, La, Ce, $R^1$)(Fe, Co, Ni, $M)_3$ phase represents the $SmFe_3$ phase, a phase in which a part of Sm in the $SmFe_3$ phase is substituted with one or more elements selected from the group consisting of Sm, La, Ce, and $R^1$, a phase in which a part of Fe in the $SmFe_3$ phase is substituted with one or more elements selected from the group consisting of Co, Ni, and M, and a phase in which a part of Sm in the $SmFe_3$ phase is substituted with one or more elements selected from the group consisting of Sm, La, Ce, and $R^1$ and a part of Fe in the $SmFe_3$ phase is substituted with one or more elements selected from the group consisting of Co, Ni, and M.

The entire composition (the sum of the crystal phase and the phase other than the crystal phase) of the magnetic material precursor can be set to be equal to or larger than the total number of moles of Sm, La, Ce, and $R^1$ of the crystal phase from the viewpoint of suppressing expression of the α-(Fe, Co, Ni, M) phase during manufacturing of the magnetic material precursor. That is, the entire composition of the magnetic material precursor may be $(Sm_{(1-x-y-z)}La_xCe_yR^1_z)_w(Fe_{(1-p-q-s)}Co_pNi_qM_s)_{17}$ (where, w is 2.00 to 3.00). In this case, x, y, z, p, q, and s may be the same as x, y, z, p, q, and s in the above-described formula that represents the composition of the crystal phase. From the viewpoint of suppressing the expression of the α-(Fe, Co, Ni, M) phase, w is preferably 2.02 or more, 2.04 or more, 2.06 or more, 2.08 or more, 2.10 or more, 2.20 or more, 2.30 or more, 2.40 or more, or 2.50 or more. On the other hand, from the viewpoint of decreasing the volume fraction of the (Sm, La, Ce, $R^1$)(Fe, Co, Ni, $M)_3$ phase, w is preferably 2.90 or less, 2.80 or less, 2.70 or less, or 2.60 or less.

The magnetic material precursor can be obtained by using a well-known manufacturing method. Examples of the method of obtaining the magnetic material precursor include a method of melting a raw material containing an element constituting the magnetic material precursor and solidifying the melted material. Examples of the method of melting the raw material include a method in which the raw material is charged into a container, such as a crucible, the raw material is arc-melted or high-frequency melted in the container to obtain a molten metal, and then the molten metal is injected into a mold, such as a book mold, or the molten metal is solidified in the crucible. From the viewpoints of suppressing coarsening of the crystal phase in the magnetic material precursor and enhancing homogenization of the crystal phase, it is preferable to increase a cooling rate of the molten metal. From these viewpoints, it is preferable to inject the molten metal into the mold, such as the book mold. Also, from the viewpoints of suppressing the coarsening of the crystal phase in the magnetic material precursor and enhancing the homogenization of the crystal phase, for example, the following method may be adopted. That is, an ingot obtained by high-frequency melting or arc-melting the raw material in the container and to solidify the melted material may be melted again by high-frequency melting or the like, the melt may be quenched by using a strip casting method, a liquid quenching method, and the like to obtain a flake, and the flake may be used as the magnetic material precursor.

Prior to nitriding to be described below, the magnetic material precursor may be subjected to heat treatment (hereinafter, such heat treatment may be referred to as "homogenization heat treatment") in order to homogenize crystal grains in the magnetic material precursor. A temperature of the homogenization heat treatment may be, for example, 1273 K or higher, 1323 K or higher, or 1373 K or higher, and may be 1523 K or lower, 1473 K or lower, or 1423 K or lower. The homogenization heat treatment time may be, for example, 6 hours or longer, 12 hours or longer, 18 hours or longer, or 24 hours or longer, and may be 48 hours or shorter, 42 hours or shorter, 36 hours or shorter, or 30 hours or shorter.

It is preferable that the homogenization heat treatment be performed in vacuum or in an inert gas atmosphere in order to suppress oxidation of the magnetic material precursor. The nitrogen gas atmosphere is not included in the inert gas atmosphere. This is because when the homogenization heat treatment is performed in the nitrogen gas atmosphere, the phase having the $Th_2Zn_{17}$ type and/or $Th_2Ni_{17}$ type crystal structures is likely to be decomposed.

Nitriding Step

The magnetic material precursor described above is nitrided. As a result, the crystal phase in the magnetic material precursor is nitrided to form the main phase in the Sm—Fe—N-based magnetic material according to the present disclosure.

A nitriding method is not particularly limited as long as a desired main phase can be obtained, but typically, examples thereof include a method in which the magnetic material precursor is heated and exposed to an atmosphere containing nitrogen gas or exposed to a gas atmosphere containing nitrogen (N). Examples of the atmosphere containing nitrogen gas include the nitrogen gas atmosphere, a mixed gas atmosphere of nitrogen gas and inert gas, and a mixed gas atmosphere of nitrogen gas and hydrogen gas. Examples of the gas atmosphere containing nitrogen (N) include an ammonia gas atmosphere and a mixed gas atmosphere of ammonia gas and hydrogen gas. The atmospheres described so far as an example may be combined. From the viewpoint of nitriding efficiency, the ammonia gas atmosphere, the mixed gas atmosphere of ammonia gas and hydrogen gas, and the mixed gas atmosphere of nitrogen gas and hydrogen gas are preferable.

The magnetic material precursor may be pulverized to obtain magnetic material precursor powder before nitriding, and then the magnetic material precursor powder may be nitrided. By performing nitriding after pulverizing the magnetic material precursor, the crystal phase present inside the magnetic material precursor can be sufficiently nitrided. It is preferable that the magnetic material precursor be pulverized in the inert gas atmosphere. The nitrogen gas atmosphere may be included in the inert gas atmosphere. As a result, the oxidation of the magnetic material precursor during pulverization can be suppressed. A particle size of the magnetic material precursor powder may be, in terms of $D_{50}$, 5 μm or more, 10 μm or more, or 15 μm or more, and may be 50 μm or less, 40 μm or less, 30 μm or less, 25 μm or less, or 20 μm or less.

A nitriding temperature may be, for example, 673 K or higher, 698 K or higher, 723 K or higher, or 748 K or higher, and may be 823 K or lower, 798 K or lower, or 773 K or lower. Further, the nitriding time may be, for example, 4 hours or longer, 8 hours or longer, 12 hours or longer, or 16 hours or longer, and may be 48 hours or shorter, 36 hours or shorter, 24 hours or shorter, 20 hours or shorter, or 18 hours or shorter.

Modification

The Sm—Fe—N-based magnetic material and the manufacturing method thereof according to the present disclosure are not limited to the embodiments described so far, and may be appropriately modified within the scope described in the claims. For example, the Sm—Fe—N-based magnetic material according to the present disclosure may be powder or a molded body of the powder. The molded body may be the bond molded body or a sintered molded body. As the molded body, the bond molded body is preferable from the viewpoint of easily avoiding a temperature at which nitrogen (N) in the main phase is separated (decomposed) in a molding step. Examples of the bond include a resin and a low melting point metal bond. Examples of the low melting point metal bond include a zinc metal or a zinc alloy and a combination thereof.

Hereinafter, the Sm—Fe—N-based magnetic material and the manufacturing method thereof according to the present disclosure will be described in more detail with reference to Examples and Comparative Examples. Note that the Sm—Fe—N-based magnetic material and the manufacturing method thereof according to the present disclosure are not limited to the conditions used in Examples below.

Preparation of Sample

Samples of the Sm—Fe—N-based magnetic material were prepared as follows.

Metal Sm, metal La, a Ce—Fe alloy, metal Fe, metal Co, and metal Ni were mixed such that the main phase had a composition shown in Table 1-1, and the mixture was high-frequency melted at 1673 K (1400° C.) and solidified to obtain the magnetic material precursor. In the mixing, the total number of mixing moles of Sm, La, and Ce was larger than the total number of moles of Sm, La, and Ce in the main phase such that the volume fraction of the main phase was 95% to 100%. Note that in the present specification, for example, "metal Sm" means Sm that is not alloyed. It is needless to say that the metal Sm may contain the unavoidable impurity.

The magnetic material precursor was subjected to the homogenization heat treatment in an argon gas atmosphere at 1373 K for 24 hours.

The magnetic material precursor after the homogenization heat treatment was charged into a glove box, and the magnetic material precursor was pulverized by using a cutter mill in the nitrogen gas atmosphere. The particle size of the magnetic material precursor powder after the pulverization was 20 μm or less in terms of $D_{50}$.

The magnetic material precursor powder was heated to 748 K and nitrided for 16 hours in the nitrogen gas atmosphere. An amount of nitriding was grasped by a mass change in the magnetic material precursor powder before and after nitriding.

Evaluation

For each sample, the composition, the volume fraction, the density, and the lattice volume of the main phase were obtained by the measurement method described above. Further, for each sample, the magnetic characteristic was measured by applying the maximum magnetic field of 9 T by using a physical property measurement system PPMS (registered trademark)-VSM. As for the measurement of the magnetic characteristic, each sample powder after nitriding was solidified while being magnetically oriented in an epoxy resin, and the magnetic characteristic of each sample after solidification was measured at 300 K to 453 K in an easy-magnetization axis direction and a hard-magnetization axis direction. Saturation magnetization Ms was calculated from the measured values in the easy-magnetization axis direction by using law of approach to saturation. Further, an anisotropic magnetic field Ha was obtained from an intersection of a hysteresis curve in the easy-magnetization axis direction and a hysteresis curve in the hard-magnetization axis direction.

Figure 2:
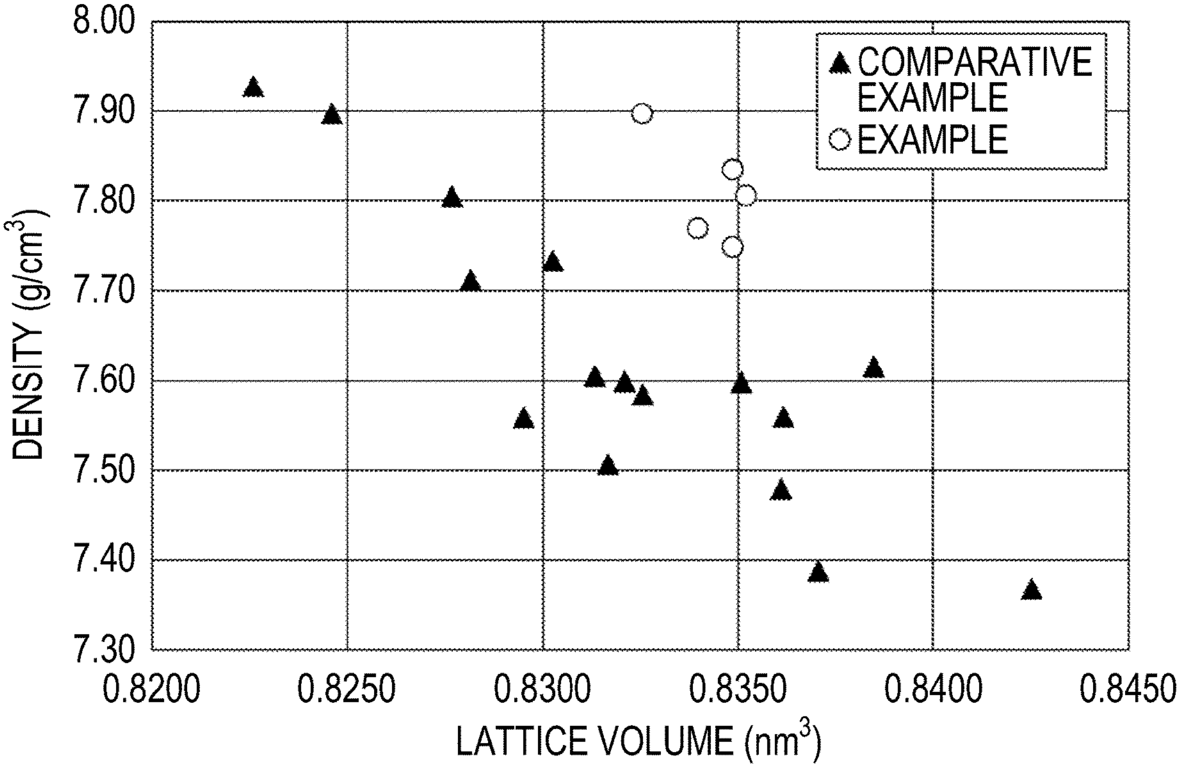
FIG. 2 is a graph showing a relationship between the lattice volume and a density.

The results are shown in Table 1-2. FIG. 1 is a graph showing a relationship between the lattice volume and the saturation magnetization Ms (300 K). FIG. 2 is a graph showing a relationship between the lattice volume and the density.

TABLE 1-1

| | | The number of moles of rare earth site | | | | Molar ratio of iron group site | | | |
|---|---|---|---|---|---|---|---|---|---|
| | Composition of main phase (target) | Sm (1 − x − y) | La (x) | Ce (y) | La + Ce (x + y) | Fe (1 − p − q) | Co (p) | Ni (q) | Co + Ni (p + q) |
| Comparative Example 1 | $Sm_2Fe_{17}N_3$ | 1.00 | 0.00 | 0.00 | 0.00 | 1.00 | 0.00 | 0.00 | 0.00 |
| Comparative Example 2 | $Sm_2(Fe_{0.85}Co_{0.15})_{17}N_3$ | 1.00 | 0.00 | 0.00 | 0.00 | 0.85 | 0.15 | 0.00 | 0.15 |
| Comparative Example 3 | $Sm_2(Fe_{0.7}Co_{0.3})_{17}N_3$ | 1.00 | 0.00 | 0.00 | 0.00 | 0.70 | 0.30 | 0.00 | 0.30 |
| Comparative Example 4 | $(Sm_{0.9}La_{0.1})_2(Fe_{0.7}Co_{0.3})_{17}N_3$ | 0.90 | 0.10 | 0.00 | 0.10 | 0.70 | 0.30 | 0.00 | 0.30 |
| Comparative Example 5 | $(Sm_{0.79}La_{0.21})_{12}Fe_{17}N_3$ | 0.79 | 0.21 | 0.00 | 0.21 | 1.00 | 0.00 | 0.00 | 0.00 |
| Comparative Example 6 | $(Sm_{0.8}La_{0.2})_2(Fe_{0.85}Co_{0.15})_{17}N_3$ | 0.79 | 0.21 | 0.00 | 0.21 | 0.85 | 0.15 | 0.00 | 0.15 |
| Comparative Example 7 | $(Sm_{0.8}La_{0.2})_2(Fe_{0.7}Co_{0.3})_{17}N_3$ | 0.80 | 0.20 | 0.00 | 0.20 | 0.70 | 0.30 | 0.00 | 0.30 |
| Comparative Example 8 | $(Sm_{0.95}La_{0.05})_2(Fe_{0.9}Co_{0.1})_{17}N_3$ | 0.95 | 0.05 | 0.00 | 0.05 | 0.90 | 0.10 | 0.00 | 0.10 |
| Comparative Example 9 | $(Sm_{0.95}La_{0.05})_2(Fe_{0.8}Co_{0.2})_{17}N_3$ | 0.95 | 0.05 | 0.00 | 0.05 | 0.80 | 0.20 | 0.00 | 0.20 |
| Comparative Example 10 | $Sm_2(Fe_{0.94}Co_{0.05}Ni_{0.01})_{17}N_3$ | 1.00 | 0.00 | 0.00 | 0.00 | 0.94 | 0.05 | 0.01 | 0.06 |
| Comparative Example 11 | $(Sm_{0.86}Ce_{0.09}La_{0.04})_2(Fe_{1.0})_{17}N_3$ | 0.86 | 0.04 | 0.09 | 0.14 | 1.00 | 0.00 | 0.00 | 0.00 |
| Comparative Example 12 | $(Sm_{0.96}Ce_{0.04})_2(Fe_{0.98}Ni_{0.02})_{17}N_3$ | 0.96 | 0.00 | 0.04 | 0.04 | 0.98 | 0.00 | 0.02 | 0.02 |
| Comparative Example 13 | $(Sm_{0.98}Ce_{0.02})_2(Fe_{0.9}Ni_{0.1})_{17}N_3$ | 0.98 | 0.00 | 0.02 | 0.02 | 0.90 | 0.00 | 0.10 | 0.10 |
| Comparative Example 14 | $(Sm_{0.98}Ce_{0.02})_2(Fe_{0.64}Co_{0.26}Ni_{0.1})_{17}N_3$ | 0.98 | 0.00 | 0.02 | 0.02 | 0.65 | 0.26 | 0.10 | 0.35 |
| Comparative Example 15 | $(Sm_{0.98}Ce_{0.02})_2(Fe_{0.68}Co_{0.26}Ni_{0.06})_{17}N_3$ | 0.98 | 0.00 | 0.02 | 0.02 | 0.69 | 0.25 | 0.06 | 0.31 |
| Comparative Example 16 | $Sm_2(Fe_{0.88}Co_{0.05}Ni_{0.07})_{17}N_3$ | 1.00 | 0.00 | 0.00 | 0.00 | 0.88 | 0.05 | 0.07 | 0.12 |
| Example 1 | $(Sm_{1.0})_2(Fe_{0.99}Co_{0.01})_{17}N_3$ | 1.00 | 0.00 | 0.00 | 0.00 | 0.99 | 0.01 | 0.00 | 0.01 |
| Example 2 | $(Sm_{0.99}La_{0.01})_2(Fe_{0.99}Co_{0.01})_{17}N_3$ | 0.99 | 0.01 | 0.00 | 0.01 | 0.99 | 0.01 | 0.00 | 0.01 |
| Example 3 | $Sm_2(Fe_{0.96}Co_{0.04})_{17}N_3$ | 1.00 | 0.00 | 0.00 | 0.00 | 0.96 | 0.04 | 0.00 | 0.04 |
| Example 4 | $Sm_2(Fe_{1.0}Ni_{0.01})_{17}N_3$ | 1.00 | 0.00 | 0.00 | 0.00 | 0.99 | 0.00 | 0.01 | 0.01 |
| Example 5 | $Sm_2(Fe_{0.97}Ni_{0.03})_{17}N_3$ | 1.00 | 0.00 | 0.00 | 0.00 | 0.97 | 0.00 | 0.03 | 0.03 |

| | Composition of main phase (target) | Content of each element in main phase (% by atom) | | | | | | | The number of nitriding moles |
|---|---|---|---|---|---|---|---|---|---|
| | | Sm | La | Ce | Fe | Co | Ni | N | |
| Comparative Example 1 | $Sm_2Fe_{17}N_3$ | 9.09 | 0.00 | 0.00 | 77.27 | 0.00 | 0.00 | 13.64 | 3.0 |
| Comparative Example 2 | $Sm_2(Fe_{0.85}Co_{0.15})_{17}N_3$ | 9.09 | 0.00 | 0.00 | 65.85 | 11.42 | 0.00 | 13.64 | 2.9 |
| Comparative Example 3 | $Sm_2(Fe_{0.7}Co_{0.3})_{17}N_3$ | 9.09 | 0.00 | 0.00 | 54.26 | 23.01 | 0.00 | 13.64 | 2.8 |
| Comparative Example 4 | $(Sm_{0.9}La_{0.1})_2(Fe_{0.7}Co_{0.3})_{17}N_3$ | 8.18 | 0.91 | 0.00 | 54.10 | 23.17 | 0.00 | 13.64 | 2.9 |
| Comparative Example 5 | $(Sm_{0.79}La_{0.21})_{12}Fe_{17}N_3$ | 7.21 | 1.88 | 0.00 | 77.27 | 0.00 | 0.00 | 13.64 | 3.0 |
| Comparative Example 6 | $(Sm_{0.8}La_{0.2})_2(Fe_{0.85}Co_{0.15})_{17}N_3$ | 7.22 | 1.87 | 0.00 | 65.55 | 11.72 | 0.00 | 13.64 | 3.0 |
| Comparative Example 7 | $(Sm_{0.8}La_{0.2})_2(Fe_{0.7}Co_{0.3})_{17}N_3$ | 7.23 | 1.86 | 0.00 | 54.21 | 23.06 | 0.00 | 13.64 | 2.9 |
| Comparative Example 8 | $(Sm_{0.95}La_{0.05})_2(Fe_{0.9}Co_{0.1})_{17}N_3$ | 8.65 | 0.44 | 0.00 | 69.57 | 7.70 | 0.00 | 13.64 | 2.9 |
| Comparative Example 9 | $(Sm_{0.95}La_{0.05})_2(Fe_{0.8}Co_{0.2})_{17}N_3$ | 8.64 | 0.45 | 0.00 | 61.77 | 15.50 | 0.00 | 13.64 | 2.9 |
| Comparative Example 10 | $Sm_2(Fe_{0.94}Co_{0.05}Ni_{0.01})_{17}N_3$ | 9.09 | 0.00 | 0.00 | 72.69 | 3.80 | 0.78 | 13.64 | 3.2 |
| Comparative Example 11 | $(Sm_{0.86}Ce_{0.09}La_{0.04})_2(Fe_{1.0})_{17}N_3$ | 7.84 | 0.39 | 0.86 | 77.27 | 0.00 | 0.00 | 13.64 | 3.1 |
| Comparative Example 12 | $(Sm_{0.96}Ce_{0.04})_2(Fe_{0.98}Ni_{0.02})_{17}N_3$ | 8.76 | 0.00 | 0.34 | 75.77 | 0.00 | 1.50 | 13.64 | 3.1 |

TABLE 1-1-continued

| | Composition of main phase (target) | The number of moles of rare earth site: Sm (1 − x − y) | La (x) | Ce (y) | La + Ce (x + y) | Molar ratio of iron group site: Fe (1 − p − q) | Co (p) | Ni (q) | Co + Ni (p + q) |
|---|---|---|---|---|---|---|---|---|---|
| Comparative Example 13 | $(Sm_{0.98}Ce_{0.02})_2(Fe_{0.9}Ni_{0.1})_{17}N_3$ | 8.93 | 0.00 | 0.16 | 69.45 | 0.00 | 7.82 | 13.64 | 3.0 |
| Comparative Example 14 | $(Sm_{0.98}Ce_{0.02})_2(Fe_{0.64}Co_{0.26}Ni_{0.1})_{17}N_3$ | 8.94 | 0.00 | 0.15 | 49.98 | 19.77 | 7.52 | 13.64 | 3.0 |
| Comparative Example 15 | $(Sm_{0.98}Ce_{0.02})_2(Fe_{0.68}Co_{0.26}Ni_{0.06})_{17}N_3$ | 8.94 | 0.00 | 0.15 | 53.21 | 19.56 | 4.49 | 13.64 | 3.0 |
| Comparative Example 16 | $Sm_2(Fe_{0.88}Co_{0.05}Ni_{0.07})_{17}N_3$ | 9.09 | 0.00 | 0.00 | 68.19 | 3.86 | 5.22 | 13.64 | 3.0 |
| Example 1 | $(Sm_{1.0})_2(Fe_{0.99}Co_{0.01})_{17}N_3$ | 9.09 | 0.00 | 0.00 | 76.51 | 0.76 | 0.00 | 13.64 | 3.2 |
| Example 2 | $(Sm_{0.99}La_{0.01})_2(Fe_{0.99}Co_{0.01})_{17}N_3$ | 9.00 | 0.09 | 0.00 | 76.50 | 0.77 | 0.00 | 13.64 | 3.2 |
| Example 3 | $Sm_2(Fe_{0.96}Co_{0.04})_{17}N_3$ | 9.09 | 0.00 | 0.00 | 74.24 | 3.04 | 0.00 | 13.64 | 3.2 |
| Example 4 | $Sm_2(Fe_{1.0}Ni_{0.01})_{17}N_3$ | 9.09 | 0.00 | 0.00 | 76.47 | 0.00 | 0.80 | 13.64 | 3.2 |
| Example 5 | $Sm_2(Fe_{0.97}Ni_{0.03})_{17}N_3$ | 9.09 | 0.00 | 0.00 | 74.86 | 0.00 | 2.42 | 13.64 | 3.1 |

TABLE 1-2

| | Machine learning lattice volume (reference) ($nm^3$) | Main phase ratio (% by volume) | Crystal structure of main phase: a-Axis length (nm) | c-Axis length (nm) | Lattice volume ($nm^3$) | (a-Axis length)/(c-Axis length) | Density ($g/cm^3$) | Magnetic characteristic 300K: Saturation magnetization Ms (T) | 300K: Anisotropic magnetic field Ha (T) | 453K: Saturation magnetization Ms (T) | 453K: Anisotropic magnetic field Ha (T) |
|---|---|---|---|---|---|---|---|---|---|---|---|
| Comparative Example 1 | 0.836 | 95.2 | 0.8742 | 1.2668 | 0.8385 | 1.4491 | 7.62 | 1.51 | 15.96 | 1.38 | 10.05 |
| Comparative Example 2 | 0.832 | 94.6 | 0.8718 | 1.2647 | 0.8325 | 1.4506 | 7.58 | 1.44 | 15.71 | 1.35 | 11.06 |
| Comparative Example 3 | 0.828 | 95.0 | 0.8699 | 1.2630 | 0.8277 | 1.4519 | 7.80 | 1.43 | 16.96 | 1.34 | 11.56 |
| Comparative Example 4 | 0.830 | 95.2 | 0.8705 | 1.2618 | 0.8281 | 1.4495 | 7.71 | 1.42 | 16.84 | 1.32 | 10.81 |
| Comparative Example 5 | 0.839 | 96.2 | 0.8762 | 1.2673 | 0.8425 | 1.4465 | 7.37 | 1.45 | 14.45 | 1.31 | 7.99 |
| Comparative Example 6 | 0.835 | 96.2 | 0.8738 | 1.2644 | 0.8361 | 1.4470 | 7.48 | 1.46 | 15.33 | 1.35 | 9.68 |
| Comparative Example 7 | 0.831 | 94.4 | 0.8720 | 1.2625 | 0.8313 | 1.4479 | 7.60 | 1.41 | 16.46 | 1.32 | 10.81 |
| Comparative Example 8 | 0.834 | 94.7 | 0.8734 | 1.2658 | 0.8362 | 1.4494 | 7.56 | 1.46 | 16.21 | 1.34 | 10.68 |
| Comparative Example 9 | 0.832 | 96.1 | 0.8716 | 1.2640 | 0.8317 | 1.4502 | 7.51 | 1.43 | 17.34 | 1.33 | 11.06 |
| Comparative Example 10 | 0.834 | 95.1 | 0.8721 | 1.2633 | 0.8321 | 1.4486 | 7.60 | 1.50 | 16.34 | 1.39 | 10.18 |
| Comparative Example 11 | 0.837 | 96.7 | 0.8740 | 1.2653 | 0.8371 | 1.4476 | 7.39 | 1.50 | 14.95 | 1.37 | 9.17 |
| Comparative Example 12 | 0.835 | 97.6 | 0.8733 | 1.2645 | 0.8351 | 1.4480 | 7.60 | 1.51 | 16.08 | 1.37 | 9.68 |
| Comparative Example 13 | 0.830 | 98.1 | 0.8713 | 1.2627 | 0.8302 | 1.4492 | 7.73 | 1.41 | 18.10 | 1.27 | 10.05 |
| Comparative Example 14 | 0.824 | 96.0 | 0.8684 | 1.2594 | 0.8226 | 1.4502 | 7.93 | 1.37 | 16.84 | 1.26 | 10.43 |
| Comparative Example 15 | 0.826 | 97.2 | 0.8691 | 1.2606 | 0.8246 | 1.4504 | 7.90 | 1.41 | 17.84 | 1.31 | 10.93 |
| Comparative Example 16 | 0.831 | 98.2 | 0.8711 | 1.2622 | 0.8295 | 1.4489 | 7.56 | 1.44 | 17.59 | 1.29 | 10.68 |
| Example 1 | 0.836 | 97.2 | 0.8733 | 1.2646 | 0.8352 | 1.4480 | 7.81 | 1.56 | 15.83 | 1.43 | 9.80 |
| Example 2 | 0.836 | 95.4 | 0.8731 | 1.2646 | 0.8349 | 1.4483 | 7.83 | 1.60 | 17.59 | 1.46 | 10.18 |
| Example 3 | 0.835 | 94.9 | 0.8731 | 1.2646 | 0.8349 | 1.4483 | 7.75 | 1.58 | 16.59 | 1.45 | 10.05 |
| Example 4 | 0.835 | 93.9 | 0.8729 | 1.2638 | 0.8340 | 1.4478 | 7.77 | 1.60 | 16.34 | 1.46 | 10.05 |
| Example 5 | 0.834 | 94.3 | 0.8729 | 1.2616 | 0.8325 | 1.4453 | 7.90 | 1.60 | 17.34 | 1.44 | 10.05 |

From Table 1-1, Table 1-2, FIG. 1, and FIG. 2, for the samples in Examples 1 to 5, the lattice volume of the main phase is 0.830 $nm^3$ to 0.840 $nm^3$, and the density of the main phase is 7.70 $g/cm^3$ to 8.00 $g/cm^3$, it can be understood that the saturation magnetization is improved. In addition, from FIG. 2, in the samples of Comparative Examples 1 to 14, the lattice volume and the density have the inversely proportional relationship, and in the samples of Examples 1 to 5, the density is higher than the inversely proportional relationship.

From these results, the effects of the Sm—Fe—N-based magnetic material and the manufacturing method thereof according to the present disclosure can be confirmed.

What is claimed is:

1. An Sm—Fe—N-based magnetic material comprising a main phase having at least any one of $Th_2Zn_{17}$ type and $Th_2Ni_{17}$ type crystal structures, wherein:

the main phase has a composition represented by a molar ratio formula $(Sm_{(1-x-y-z)}La_xCe_yR^1_z)_2(Fe_{(1-p-q-s)}Co_pNi_qM_s)_{17}N_h$, wherein:

$R^1$ is one or more rare earth elements other than Sm, La, and Ce, and Zr,

M is (i) an unavoidable impurity element or (ii) the unavoidable impurity element and at least one element other than Fe, Co, Ni, or a rare earth element, and $0 \leq x+y \leq 0.01$, $0 \leq z \leq 0.10$, $0.01 \leq p+q \leq 0.04$, $0 \leq s \leq 0.02$, and $2.9 \leq h \leq 3.1$ are satisfied;

a lattice volume of the main phase is 0.830 $nm^3$ to 0.840 $nm^3$ and a density of the main phase is 7.70 $g/cm^3$ to 8.00 $g/cm^3$.

2. The Sm—Fe—N-based magnetic material according to claim 1, wherein a volume fraction of the main phase is 95% to 100%.

3. The Sm—Fe—N-based magnetic material according to claim 1, wherein the lattice volume of the main phase is 0.833 $nm^3$ to 0.835 $nm^3$.

4. The Sm—Fe—N-based magnetic material according to claim 1, wherein the density of the main phase is 7.70 $g/cm^3$ to 7.90 $g/cm^3$.

5. A manufacturing method of the Sm—Fe—N-based magnetic material according to claim 1, the method comprising:

preparing a magnetic material precursor including a crystal phase having a composition represented by a molar ratio formula $(Sm_{(1-x-y-z)}La_xCe_yR^1_z)_2(Fe_{(1-p-q-s)}Co_pNi_qM_s)_{17}$, wherein:

$R^1$ is one or more rare earth elements other than Sm, La, and Ce, and Zr,

M is (i) an unavoidable impurity element or (ii) the unavoidable impurity element and at least one element other than Fe, Co, Ni, or a rare earth element, and $0 \le x+y \le 0.01$, $0 \le z \le 0.10$, $0.01 \le p+q \le 0.04$, and $0 \le s \le 0.02$, are satisfied; and nitriding the magnetic material precursor.

6. The method according to claim 5, wherein a volume fraction of the crystal phase is 95% to 100%.

7. The method according to claim 5, wherein the magnetic material precursor is pulverized to obtain magnetic material precursor powder, and then the magnetic material precursor powder is nitrided.

8. The method according to claim 5, wherein a raw material containing the elements constituting the magnetic material precursor is melted and solidified to obtain the magnetic material precursor.

9. The Sm—Fe—N-based magnetic material according to claim 1, wherein the main phase does not contain boron, except as an unavoidable impurity.

10. The method according to claim 5, wherein the main phase of the Sm—Fe—N-based magnetic material does not contain boron, except as an unavoidable impurity.

* * * * *